United States Patent
Rist et al.

(10) Patent No.: US 10,648,555 B2
(45) Date of Patent: May 12, 2020

(54) SHIFT CONTROL METHOD FOR AN AUTOMATED RANGE-CHANGE TRANSMISSION

(71) Applicant: ZF Friedrichshafen AG, Friedrichshafen (DE)

(72) Inventors: Martin Rist, Oberteuringen (DE); Tobias Mayerhofer, Ravensburg (DE); Mario Steinborn, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 99 days.

(21) Appl. No.: 15/840,556

(22) Filed: Dec. 13, 2017

(65) Prior Publication Data
US 2018/0172142 A1 Jun. 21, 2018

(30) Foreign Application Priority Data

Dec. 15, 2016 (DE) .................. 10 2016 225 063

(51) Int. Cl.
*F16H 61/70* (2006.01)
*F16H 61/04* (2006.01)
(Continued)

(52) U.S. Cl.
CPC ..... *F16H 61/0403* (2013.01); *F16H 61/0437* (2013.01); *F16H 61/702* (2013.01);
(Continued)

(58) Field of Classification Search
CPC .................. F16H 61/70; F16H 61/0403; F16H 2061/0422; F16H 2061/0411
See application file for complete search history.

(56) References Cited

U.S. PATENT DOCUMENTS 5,441,462 A * 8/1995 Chan ................. B60W 10/02
477/74
5,655,407 A * 8/1997 Dresden, III ........ B60W 10/06
74/336 R
(Continued)

FOREIGN PATENT DOCUMENTS

DE 102008002380 A1 12/2009
DE 10 2010 009 673 A1 9/2011
(Continued)

OTHER PUBLICATIONS

Machine translation of IDS cited art DE 102011117586 filed Dec. 8, 2019 (Year: 2019).*

(Continued)

*Primary Examiner* — Tisha D Lewis
(74) *Attorney, Agent, or Firm* — Davis & Bujold PLLC; Michael J. Bujold

(57) ABSTRACT

A method of controlling the gear shifting of an automatic range-change transmission, which is arranged between a drive engine and a final drive in a drive train of a motor vehicle and includes at least one multi-stage main transmission, a two-stage front-mounted group upstream of the main transmission, and a transmission brake. The main transmission can be shifted, via unsynchronized clutches, and the front-mounted group can be shifted, via synchronized clutches. Upon upshifting in the range-change transmission including at least one change of a transmission ratio stage of the front-mounted group, synchronization of the front-mounted group is effected via actuation of the synchronized clutch of the front-mounted group and supportingly via at least intermittently parallel actuation of the transmission brake. Actuation of the transmission brake, for supporting the synchronization of the front-mounted group, is effected on the basis of a prevailing driving or operating situation.

8 Claims, 2 Drawing Sheets

(51) Int. Cl.
*F16H 59/18* (2006.01)
*F16H 59/36* (2006.01)
*F16H 59/72* (2006.01)

(52) U.S. Cl.
CPC .............. *F16H 59/18* (2013.01); *F16H 59/36* (2013.01); *F16H 59/72* (2013.01); *F16H 2059/366* (2013.01); *F16H 2061/0411* (2013.01); *Y02T 10/56* (2013.01)

(56) References Cited

U.S. PATENT DOCUMENTS

| | | | |
|---|---|---|---|
| 5,910,069 A * | 6/1999 | Markyvech | B60W 10/06 |
| | | | 477/109 |
| 6,461,273 B1 * | 10/2002 | Davis | F16H 3/12 |
| | | | 477/124 |
| 8,915,160 B2 | 12/2014 | Guggolz et al. | |
| 9,239,106 B2 | 1/2016 | Schneider et al. | |
| 2005/0085966 A1 * | 4/2005 | Eriksson | B60W 10/06 |
| | | | 701/36 |
| 2006/0211536 A1 * | 9/2006 | Guggolz | B60W 10/02 |
| | | | 477/34 |
| 2007/0042865 A1 * | 2/2007 | Steen | B60W 30/18 |
| | | | 477/182 |
| 2010/0041513 A1 * | 2/2010 | Doebele | F16H 61/0403 |
| | | | 477/75 |

FOREIGN PATENT DOCUMENTS

| | | |
|---|---|---|
| DE | 102010002725 A1 | 9/2011 |
| DE | 102011117586 A1 | 5/2013 |

OTHER PUBLICATIONS

German Search Report issued in corresponding German Patent Application No. 10 2016 225 063.9 dated Sep. 26, 2019.

* cited by examiner

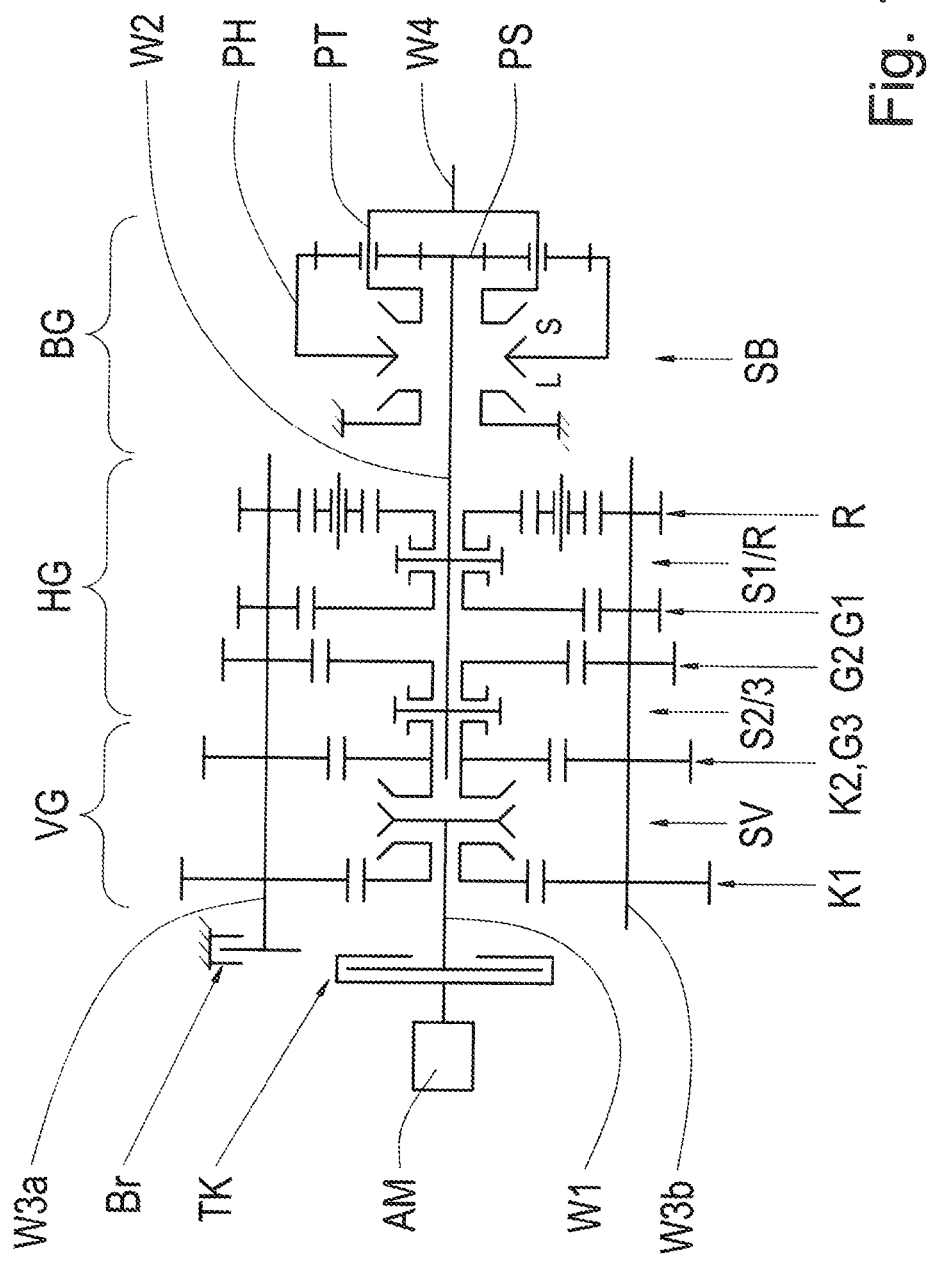

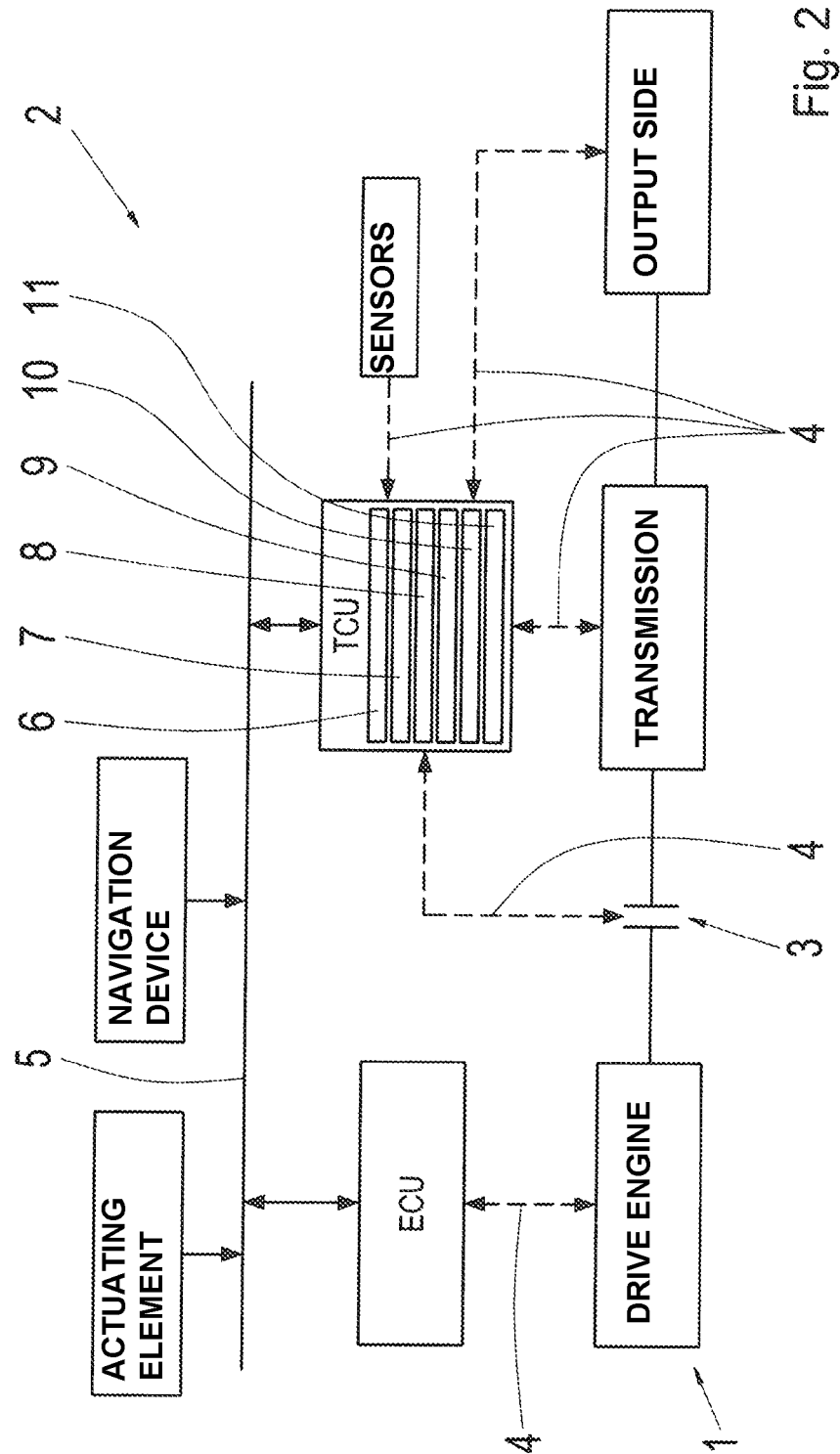

SHIFT CONTROL METHOD FOR AN AUTOMATED RANGE-CHANGE TRANSMISSION

This application claims priority from German patent application serial no. 10 2016 225 063.9 filed Dec. 15, 2016.

FIELD OF THE INVENTION

This invention relates to a method for controlling the gear shifting of an automatic range-change transmission, which is arranged in a drive train of a motor vehicle between a drive engine and a final drive and which comprises at least one multi-stage main transmission as well as a two-stage front-mounted group upstream of the main transmission, and a transmission brake. The invention furthermore relates to a control unit, which is configured for carrying out the method, and a matching computer program product.

BACKGROUND OF THE INVENTION

Range-change transmissions having a multi-stage main transmission and a front-mounted group drive-coupled to the main transmission, upstream thereof, and having a range group drive-coupled to the main transmission, downstream thereof, have been known for some time and are preferably used in utility vehicles. Due to the front-mounted group usually having a two-stage design and a small transmission ratio increment, also called splitter group, the transmission ratio increment intervals between the transmission ratio stages of the main transmission are approximately halved, thus doubling the total number of available transmission ratio stages. By means of a typically two-stage range group, the gear range of the overall transmission is increased considerably and the total number of available gear ratio stages is again doubled. In combination with a three-stage main transmission (having three forward gears and one reverse gear), this results in a 12-gear range-change transmission (having a total of twelve forward gears and a maximum of four reverse gears) and in combination with a four-stage main transmission (having four forward gears and one reverse gear), in a 16-gear range-change transmission (having a total of sixteen forward gears and a maximum of four reverse gears).

Compared to a single transmission having a comparable number of gears and similar gear stepping and spreading, the range-change transmission is considerably more compact and lighter in weight. However, because multiple gear changes in a range-change transmission require changing transmission ratio stages in a plurality of sub-transmissions and are therefore relatively complicated, most known range-change transmissions are either semi-automatic or fully automatic in design.

An example of a method for operating a range-change transmission having at least one main group, one subgroup, and one central synchronization unit is known from DE 10 2010 009 673 A1. For reducing gear shifting times during a change of an overall transmission ratio, a subgroup shifting unit (for actuating the subgroup) and the central synchronization unit are actuated in parallel, at least intermittently. An actuation period of the central synchronization unit is settable using a (open- and closed-loop) control unit, wherein the actuation period is adjusted by means of an adaptation function.

SUMMARY OF THE INVENTION

Given this background, this invention addresses the problem of introducing an improved method for controlling the gear shifting of an automatic range-change transmission, which in addition to short shifting times also permits an optimized actuation frequency of components of the automatic range-change transmission. A suitable control unit and a computer program product for carrying out the method should also be specified.

From a process engineering standpoint, a solution to this problem arises from the preamble of the independent claim in combination with the characterizing features thereof. In addition, a control unit and a computer program product are the subject matter of the other independent claims. Advantageous further developments are the subject matter of the dependent claims and of the following description.

According to the invention, a method for controlling the gear shifting of an automatic range-change transmission is proposed, which transmission is arranged in a drive train of a motor vehicle between a drive engine and a final drive and which comprises at least one multi-stage main transmission, a two-stage group upstream of the main transmission, and a transmission brake, wherein the main transmission can be shifted via unsynchronized clutches and the front-mounted group can be shifted via synchronized clutches. The clutches of the main transmission and the clutches of the front-mounted group are preferably combined in pairs each, to form a joint shifting package. In the course of an upshift in the automatic range-change transmission comprising at least one change of a transmission ratio stage of the front-mounted group, the front-mounted group and the transmission brake are actuated in parallel, at least intermittently. In other words, the synchronization of the front-mounted group is effected via actuation of the synchronized clutch of the front-mounted group and supportingly via at least intermittently parallel actuation of the transmission brake.

The invention now comprises the technical teachings that the transmission brake is actuated for supporting the synchronization of the front-mounted group on the basis of a prevailing driving or operating situation. In other words, the actuation of the transmission brake for supporting the synchronization of the front-mounted group is only effected if doing so is necessary or useful due to a prevailing driving or operating situation. The number of actuations of the transmission brake and the resulting wear on the transmission brake are thus kept low. For example, the transmission brake can be configured as a hydraulically or pneumatically actuatable multiple-disc brake. The transmission brake can also be configured as an electric motor, via which a braking torque can be applied to a transmission shaft of the range-change transmission for supporting the synchronization of the front-mounted group in the course of an upshift in the range-change transmission. For example, if the transmission brake is configured as pneumatically or hydraulically actuatable via shift valves, then the number of actuations of the shift valves can also be kept correspondingly small. By virtue of the actuation of the transmission brake, not only the front-mounted group but also the main transmission can be synchronized faster.

Specifically when it is cold, the drag torque of the range-change transmission increases significantly. Due to the increased drag torque of the range-change transmission, a speed reduction occurs considerably faster during the synchronization of the front-mounted group when the main transmission is in the neutral position than in a synchronization of the front-mounted group carried out at the operating temperature of the transmission. Consequently, actuation of the transmission brake in such an operating situation would not lead to any substantial support of the synchronization of the front-mounted group, thus the shifting time for the upshift would also not be shortened at all or not substantially. In a variant of the method according to the invention, provision is therefore made such that the transmission brake is actuated for supporting the synchronization of the front-mounted group if a transmission fluid temperature is higher than a threshold defined for the transmission fluid temperature. Hence the transmission brake can be actuated for supporting the synchronization of the front-mounted group if the transmission fluid temperature reaches or exceeds a threshold of, for example, 20° C. Unnecessary actuation of the transmission brake at lower transmission fluid temperatures can thus be avoided.

According to a further variant of the method of the invention, provision is made such that the transmission brake is actuated for supporting the synchronization of the front-mounted group if a speed of the drive engine is higher than a threshold specified for the engine speed. Thus the transmission brake can be actuated for supporting the synchronization of the front-mounted group if the speed of the drive engine reaches or exceeds a threshold of, for example, 1500 rpm, wherein upshifts can then be achieved within short shifting times. At lower engine speeds on the other hand, the front-mounted group is synchronized only via the synchronization elements of the clutch of the front-mounted group.

According to another variant of the method according to the invention, provision is made such that the transmission brake is actuated for supporting the synchronization of the front-mounted group if a current driving resistance reaches or exceeds a specified threshold. If the current driving resistance is below the specified threshold, the upshift can then be effected more slowly without actuating the transmission brake, because the synchronization of the front-mounted group can be effected solely via the mechanical synchronization elements of the clutch of the front-mounted group in order to reach the necessary shifting time. On the other hand, if the current driving resistance reaches or exceeds the specified threshold, then during an upshift in the range-change transmission, the transmission brake is actuated for supporting the synchronization of the front-mounted group actuated upon upshifting. The shifting time necessary for the upshift and hence an interruption of the traction force occurring while upshifting can thus be shortened.

In this case driving resistance is understood in particular as meaning a gradient resistance of the motor vehicle, in which a current road gradient and a mass of the vehicle are taken into account. However, it can also be an overall driving resistance of the motor vehicle, in which in addition to a gradient resistance, a rolling resistance, drag, and an acceleration resistance are also of significance.

The driving resistance threshold can be defined on the basis of the road gradient, for example, taking the mass of the vehicle into account. For example, the specified driving resistance threshold can correspond to a driving resistance while driving a fully loaded motor vehicle on a steeper gradient, for example prevailing on a gradient of 3% or more. When driving on a downhill slope, on a level plane, or on only a slight gradient of, for instance, 1%, the current driving resistance is below the specified driving resistance threshold, even in the case of a fully loaded motor vehicle, wherein synchronization of the front-mounted group is preferably effected without actuation of the transmission brake.

According to a variant of the method according to the invention, provision is made such that the transmission brake is actuated for supporting the synchronization of the front-mounted group if the motor vehicle is being operated in an off-road mode. If an off-road mode is activated, the motor vehicle is then being operated on terrain having a high driving resistance and rapid upshifts are desirable. Hence the transmission brake will be actuated for supporting the synchronization of the front-mounted group when upshifting in such an operating situation. For example, the off-road mode can be activated via an actuation element operable by a driver or via a determination of the road condition of a section of road being driven by the motor vehicle.

A further variant of the method of the invention makes provision such that the transmission brake is actuated for supporting the synchronization of the front-mounted group if a current driver input in the form of an accelerator pedal actuation reaches or exceeds a specified threshold. Thus provision can be made such that, for example, synchronization of the front-mounted group is supported by actuation of the transmission brake in the event of accelerator pedal actuation within a range of 70% to 100% of the maximum possible accelerator pedal actuation. Short shifting times thus achieved are advantageous in a driving situation with a high level of driver input and high vehicle acceleration associated therewith.

A further embodiment of the method of the invention makes provision such that along with the prevailing driving or operating situation, predictive data are also considered for the decision whether the transmission brake will be actuated for supporting synchronization of the front-mounted group. Driving or operating situations in which the transmission brake should be actuated for supporting a synchronization of the front-mounted group are preferably determined in an anticipatory manner with the aid of predictive data.

In the context of a possible variant of an embodiment, provision can be made such that the height, the slope and/or the gradient of the roadway, or also the given road type, for example, can be detected as future route data of the roadway lying ahead of the motor vehicle. The detection can preferably be effected via a navigation device coupled to a transmission control unit or via another navigation system. However, use may also be made of other detection options (e.g., sensors or cameras) for obtaining suitable data on the roadway ahead of the motor vehicle.

If it is determined by means of the predictive route data that the motor vehicle will soon no longer be on a road, i.e., will be operating off-road, or that a steep gradient lies directly ahead of the motor vehicle, then upon reaching the section of the route thus identified, a shifting strategy will be employed in which the transmission brake will be actuated for synchronizing the front-mounted group in the course of an upshift. Upshifts with short shifting times are advantageous in identified situations such as these.

The invention further relates to a control unit that is configured for carrying out the method according to the invention. The control unit comprises means that are used to carry out the method according to the invention. These means are hardware-based means and software-based means. The hardware-based means are data interfaces for exchanging data with modules of the drive train that are involved in carrying out the method according to the invention. The hardware-based means of the control unit are furthermore a processor for processing data and optionally a memory for data storage. The software-based means are program modules for carrying out the method according to the invention.

The solution according to the invention can also be embodied as a computer program product that, if it runs on a processor of the control unit, directs the processor by means of software to carry out the assigned method steps that are the subject matter of the invention. In this context, a computer-readable medium on which a computer program product described in the preceding is retrievably stored is also the subject matter of the invention.

The invention is not limited to the stated combination of the features of the independent claims or of the claims dependent thereon. In addition there are options for combining individual features, even if they arise from the claims, the following description of embodiments, or directly from the drawings. Reference to the drawings in the claims by using reference numbers shall not limit the scope of protection of the claims.

BRIEF DESCRIPTION OF THE DRAWINGS

For clarifying the invention, drawings with exemplary embodiments are appended to the description, wherein:

FIG. 1 shows a schematic design of an automatic range-change transmission having a three-stage main transmission; and FIG. 2 shows a schematic illustration of a drive train having a control unit for carrying out the method according to the invention.

DETAILED DESCRIPTION OF THE PREFERRED EMBODIMENTS

The range-change transmission depicted in FIG. 1 comprises a three-stage main transmission HG, an front-mounted group or splitter group VG connected upstream of the main transmission HG on the drive train and a range group BG downstream of the main transmission HG. In this case the main transmission HG of the range-change transmission is designed as a countershaft-type direct gear transmission and has a main shaft W2 and two countershafts W3a and W3b, wherein the first countershaft W3a is equipped with a controllable transmission brake Br.

The main transmission HG is of three-stage design having three transmission ratio stages (gears) G1, G2, G3 for forward driving and one transmission ratio stage R for reverse driving. Idler gears of the transmission ratio stages (gears) G1, G2, and R are each rotatably mounted on the main shaft W2 and can be engaged via assigned clutches. The assigned fixed gears are non-rotatably mounted on the countershafts W3a and W3b.

The highest transmission ratio stage G3 of the main transmission HG, which is designed as a direct gear, can be shifted via a direct clutch SV. The clutches of the transmission ratio stages G3 and G2 and the clutches of the transmission ratio stages G1, and R are each combined in a common shifting package, S2/3 and S1/R respectively. The main transmission HG is designed to be shifted without synchronization.

The front-mounted group VG of the range-change transmission is of two-stage design and is likewise embodied in countershaft design, wherein the two transmission ratio stages K1, K2 of the front-mounted group VG form two shiftable input constants of the main transmission HG. Because of a lower transmission difference of the two transmission ratio stages K1, K2, the front-mounted group VG is designed as a splitter group.

The idler gear of the first transmission ratio stage K1 is rotatably mounted on the input shaft W1, which is coupled via a controllable separator clutch TK to a drive engine AM configured as an internal combustion engine or as an electric motor, for example.

The idler gearwheel of the second transmission ratio stage K2 is rotatably mounted on the main shaft W2. The fixed gearwheels of both transmission ratio stages K1, K2 of the front-mounted group VG are each non-rotatably mounted on the countershafts W3a and W3b of the main transmission HG extended at the input side. The synchronized clutches of the front-mounted group VG are combined in a common shifting package SV.

The range group BG of the range-change transmission arranged downstream of the main transmission HG is likewise of two-stage design, but of planetary configuration having a single planetary gearset. The sun gear PS is connected for conjoint rotation to the main shaft W2 of the main transmission HG extended at the output side. The planetary carrier PT is coupled for conjoint rotation to the output shaft W4 of the range-change transmission. The ring gear PH is connected to a shifting package SB having two synchronized clutches, by means of which the range group BG can be alternatingly shifted to a low range L by connecting the ring gear PH to a stationary housing part, and to a high range S by connecting the ring gear PH to the planetary carrier PT. The range group BG can be shifted in a synchronized manner.

Actuation of the clutches present in the range-change transmission for setting a desired transmission ratio stage K1, K2, G3, G2, G1, R, L, S is controlled and/or regulated via a control unit of the range-change transmission. The control unit can preferably be configured as a transmission control unit.

The method according to the invention for controlling the gear shifting of the automatic range-change transmission now makes provision such that for an upshift in the automatic range-change transmission comprising at least one change of a transmission ratio stage K1, K2 of the front-mounted group VG, synchronization of the front-mounted group VG is effected via actuation of the synchronized clutch SV of the front-mounted group VG and also supportingly via at least intermittently parallel actuation of the transmission brake Br. Provision is made such that the transmission brake Br is actuated for supporting the synchronization of the front-mounted group VG on the basis of a prevailing driving or operating situation. The main transmission HG is preferably shifted to neutral during the synchronization of the front-mounted group VG.

FIG. 2 is a schematic depiction of a drive train 1 of a motor vehicle, which is a utility vehicle such as a truck. This drive train 1 is equipped with a drive engine, which can be coupled on its output side via an intervening separator clutch 3 to a drive side of an automatic range-change transmission. On the output side, the automatic range-change transmission is then linked to further output components sufficiently known to persons skilled in the art and also to the vehicle wheels of the utility vehicle.

The motor vehicle additionally comprises a control system 2 in which several different control units are interlinked via a data bus system 5, for example via a CAN bus system. Among other things, in the data bus system 5 provision is made of a transmission control unit TCU and an engine control unit ECU, the engine control unit ECU regulating the drive engine and the transmission control unit ICU regulating the automatic range-change transmission and (indirectly via a further control unit in certain circumstances) the separator clutch 3. The transmission control unit TCU can communicate bidirectionally with the transmission on the one hand and with the engine control unit ECU on the other hand. The data bus system 5 supplies the relevant data to the control units. The control units are capable of receiving and processing sensor signals and transmitting control or data signals on the basis of the sensor signals.

To this end, the transmission control unit TCU comprises a processor 6 and a storage means 7 for storing and retrieving parameters, signals, and information, and a computer program product 11, which is designed in such a way that it can actuate the transmission brake Br for supporting the synchronization of the front-mounted group in the sense of the method described above. The transmission control unit TCU furthermore has at least one receiver interface 8, which is designed to receive all relevant data from sensors and the engine control unit ECU. The transmission control unit TCU furthermore has another data processing unit 9 for processing and analyzing the received data and/or the information of the received data, and a transmitter interface 10 via which corresponding signals can be transmitted for actuating drive train components.

Data from sensors and from a navigation device are supplied to the transmission control unit TCU. The navigation device provides topographic data on the surroundings of a current position of the vehicle and on the surroundings in a defined distance ahead of the current position of the vehicle. The current vehicle position can be tracked by means of a satellite tracking system such as GPS or GLONASS.

The transmission control unit TCU controls the operation of the transmission based on driving status data and driver input data. A shifting strategy stored as a computer program in the transmission control unit TCU determines respective shifting reactions, in particular a shifting from a current gear to a target gear, or a temporary interruption of traction in the drive train 1.

Along with the detected roadway state, the driving status data used can be the current driving resistance, the current vehicle pitch, the current vehicle mass, the current vehicle speed, the current vehicle acceleration, the current engine torque, the current engine speed, and other values. These data can be provided, at least in part, by the engine control unit ECU and also by suitable sensor devices.

Driver input data, for example, can be signalized by the actuation of an accelerator pedal or of a brake pedal, detected by sensors, and routed directly or indirectly to the transmission control unit TCU.

The control system 2 also comprises means for actuating the automatic transmission and the separator clutch 3. These means comprise suitable shift valves, via which an actuator system of the automatic transmission or of the separator clutch, respectively, can be actuated. The means each comprise a connection 4 for transmitting data to the given control unit.

The connection 4 for transmitting data between the control units and the components of the drive train 1 can also be embodied by, for example, one or a plurality of electronic bus systems.

An actuating element enables the driver to switch manually between a control program for road driving and a control program for off-road driving.

The method according to the invention for controlling the gear shifting of the automatic range-change transmission TCU now makes provision such that for upshifting in the automatic transmission, the transmission brake Br is actuated for supporting the synchronization of the front-mounted group VG on the basis of a prevailing driving or operating situation. To this end, various signals are received by the receiver interface 8 of the automatic range-change transmission TCU, such as a signal that indicates the transmission fluid temperature or from which the transmission fluid temperature can be determined, a signal that indicates the current roadway slope or a signal from which the current driving resistance can be determined, a signal that indicates the engine speed or from which the engine speed can be determined, a signal that indicates the driver input or from which the driver input can be determined, and signals of corresponding predictive data.

The transmission fluid temperature can be determined by means of, for example, a temperature sensor, whereas the driver input can be determined via a position or travel sensor system arranged on the accelerator pedal and the current roadway gradient can be determined by means of a gradient sensor. The engine speed of the drive engine can be provided by the engine control unit or determined via a speed sensor, and predictive data can be provided via the navigation unit.

The received data and/or the information of the received data are processed and analyzed, and a prevailing driving or operating situation is determined in the data processor unit 9. On the basis of the driving or operating situation thus determined, the transmission control unit TCU then determines whether the transmission brake should be actuated for supporting the synchronization of the front-mounted group VG. Lastly, appropriate signals for actuating the transmission brake Br during a synchronization of the front-mounted group of the range-change transmission are emitted via the emitter interface 10.

REFERENCE SIGNS

AM Drive engine
TK Separator clutch
VG Front-mounted group, splitter group
SV Shifting package (VG), direct clutch
K1 (First) transmission ratio stage (VG)
K2 (Second) transmission ratio stage (VG)
HG Main transmission
G1 (First) transmission ratio stage (HG)
G2 (Second) transmission ratio stage (HG)
G3 (Third) transmission ratio stage (HG)
R Reverse transmission ratio stage (HG)
S1/R Shifting package (HG)
S2/3 Shifting package (HG)
BG Range group
SB Shifting package (BG)
L Low range (BG)
S High range (BG)
PH Ring gear (BG)
PS Sun gear (BG)
PT Planetary carrier (BG)
W1 Input shaft
W2 Main shaft
W3a Countershaft
W3b Countershaft
W4 Output shaft
Br Transmission brake
1 Drive train
2 Control system
3 Clutch
4 Connection
5 Data bus system
6 Processor
7 Storage means
8 Receiver interface
9 Data processing device
10 Emitter interface
11 Computer program product

The invention claimed is:

1. A method of controlling gear shifting of an automatic range-change transmission which is arranged between a drive engine and a final drive in a drive train of a motor vehicle and includes a multi-stage main transmission having unsynchronized clutches, a two-stage front-mounted group having synchronized clutches and being arranged upstream of the main transmission, and a transmission brake, the method comprising:
shifting the main transmission, via the unsynchronized clutches, and shifting the front-mounted group, via the synchronized clutches,
an upshift in the range-change transmission comprises at least one change of a transmission ratio stage of the front-mounted group,
actuating the synchronized clutch of the front-mounted group to synchronize the front-mounted group,
intermittently actuating the transmission brake in parallel with actuation of the synchronized clutch of the front-mounted group for supporting the synchronization of the front-mounted group, if a current engine speed of the drive engine is higher than a specified engine speed threshold and based on either a prevailing driving situation or operating situation, and
synchronizing the front-mounted group only via the synchronized clutches of the front-mounted group, if the current engine speed of the drive engine is lower than the specified engine speed threshold.

2. The method according to claim 1, further comprising actuating the transmission brake for supporting the synchronization of the front-mounted group if the current engine speed of the drive engine is higher than the specified engine speed threshold and a transmission fluid temperature is higher than a threshold defined for the transmission fluid temperature.

3. The method according to claim 1, further comprising specifying a driving resistance threshold of the vehicle as corresponding to a driving resistance of the vehicle while driving fully loaded on a surface having a gradient of 3%,
determining a current driving resistance of the vehicle based on a current mass of the vehicle and a gradient of a surface on which the vehicle is currently driving, and
actuating the transmission brake for supporting the synchronization of the front-mounted group if the current driving resistance either reaches or exceeds the specified driving resistance threshold of the vehicle.

4. The method according to claim 1, further comprising actuating the transmission brake for supporting the synchronization of the front-mounted group if an off-road drive mode is actuated by a driver or by determination of an off-road condition of a road being driven by the motor vehicle.

5. The method according to claim 1, further comprising actuating the transmission brake for supporting the synchronization of the front-mounted group if actuation of an accelerator pedal is within a range of 70% to 100% of a maximum possible accelerator pedal actuation.

6. The method according to claim 1, further comprising taking into account, in addition to either the prevailing driving situation or the operating situation, predictive data for determining whether the transmission brake will be actuated for supporting the synchronization of the front-mounted group,
identifying, from the predictive data, that a section of road that lies directly ahead of the motor vehicle is either off-road or has a relatively steep gradient, and
actuating a shifting strategy, in which the transmission brake is actuated for synchronizing the front-mounted group during the upshift, upon reaching the section of the road that lies directly ahead of the motor vehicle and is identified as either off-road or having the relatively steep gradient.

7. A transmission control unit of an automatic range-change transmission for carrying out a method of controlling gear shifting of an automatic range-change transmission which is arranged between a drive engine and a final drive in a drive train of a motor vehicle and includes a multi-stage main transmission having unsynchronized clutches, a two-stage front-mounted group having synchronized clutches and being arranged upstream of the main transmission, and a transmission brake, the method including: shifting the main transmission, via the unsynchronized clutches, and shifting the front-mounted group, via the synchronized clutches; an upshift in the range-change transmission comprises at least one change of a transmission ratio stage of the front-mounted group, actuating the synchronized clutch of the front-mounted group to synchronize the front-mounted group, intermittently actuating the transmission brake in parallel with actuation of the synchronized clutch of the front-mounted group for supporting the synchronization of the front-mounted group, if a current engine speed of the drive engine is higher than a specified engine speed threshold and based on either a prevailing driving situation or operating situation, and synchronizing the front-mounted group only, via the synchronized clutches of the front-mounted group if the current engine speed of the drive engine is lower than the specified engine speed threshold.

8. A computer program product having program code that are stored on a computer-readable data carrier for carrying out a method of controlling gear shifting of an automatic range-change transmission which is arranged between a drive engine and a final drive in a drive train of a motor vehicle and includes a multi-stage main transmission having unsynchronized clutches, a two-stage front-mounted group having synchronized clutches and being arranged upstream of the main transmission, and a transmission brake, the method comprising running the computer program product on a transmission control unit of the automatic range-change transmission designed for carrying out the method comprising: shifting the main transmission, via the unsynchronized clutches, and B shifting the front-mounted group, via the synchronized clutches; an upshift in the range-change transmission comprises at least one change of a transmission ratio stage of the front-mounted group, actuating the synchronized clutch of the front-mounted group to synchronize the front-mounted group, intermittently actuating the transmission brake in parallel with actuation of the synchronized clutch of the front-mounted group for supporting the synchronization of the front-mounted group, if a current engine speed of the drive engine is higher than a specified engine speed threshold and based on either a prevailing driving situation or operating situation, and synchronizing the front-mounted group only via the synchronized clutches of the front-mounted group if the current engine speed of the drive engine is lower than the specified engine speed threshold.

* * * * *